July 11, 1933.    E. M. LOWRY    1,917,379
AUTOMATIC GLOSS METER
Filed Aug. 2, 1928    2 Sheets-Sheet 1
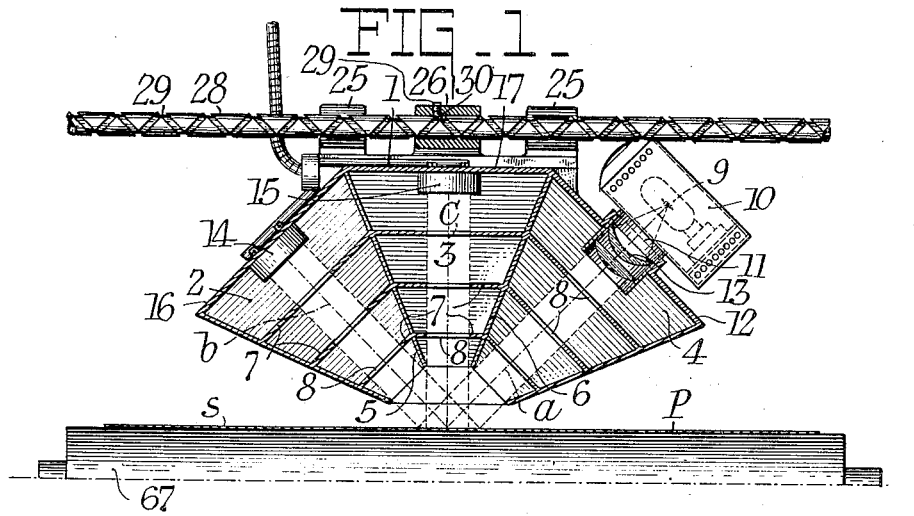
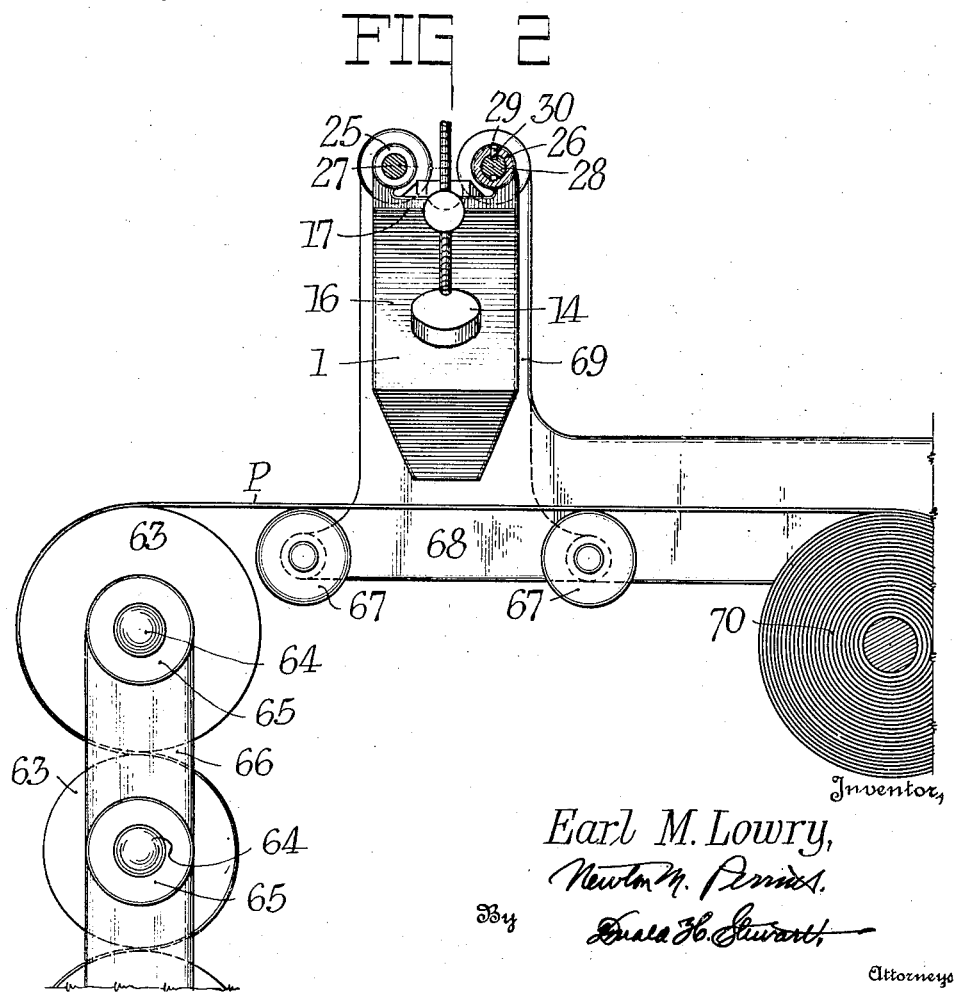
Inventor,
Earl M. Lowry,
By
Attorneys

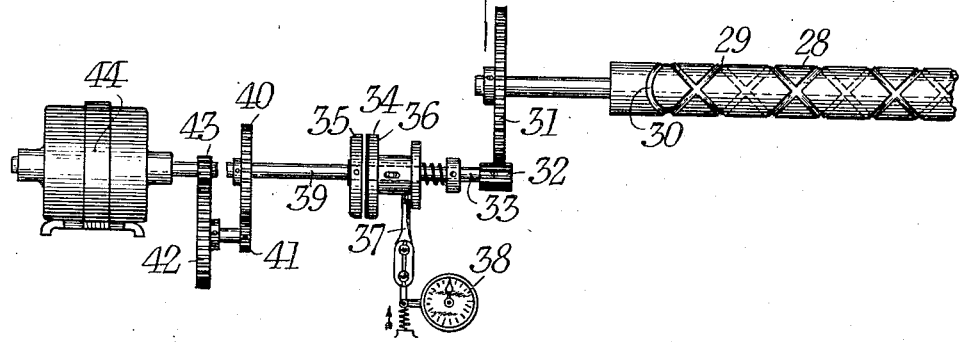
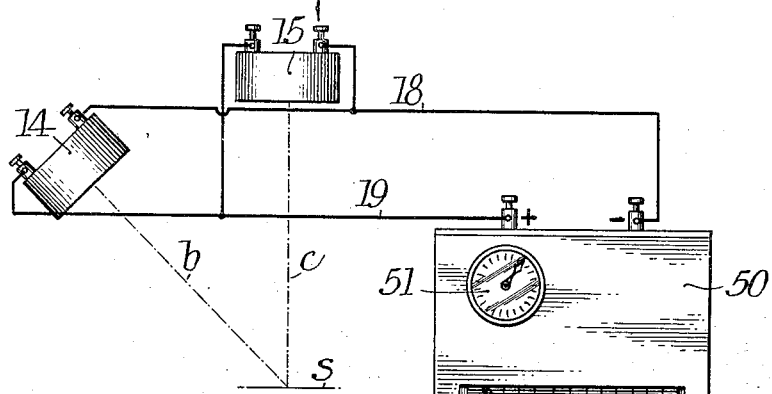
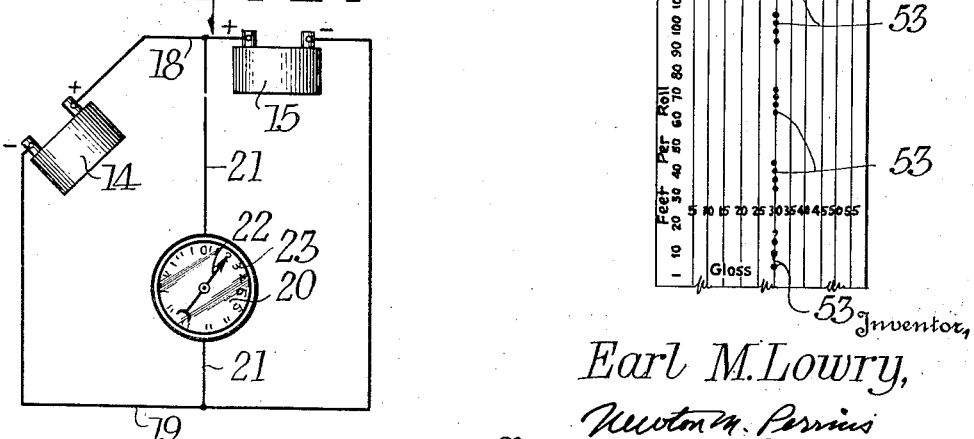

Patented July 11, 1933

1,917,379

UNITED STATES PATENT OFFICE

EARL M. LOWRY, OF ROCHESTER, NEW YORK, ASSIGNOR TO EASTMAN KODAK COMPANY, OF ROCHESTER, NEW YORK, A CORPORATION OF NEW YORK

AUTOMATIC GLOSS METER

Application filed August 2, 1928. Serial No. 296,965.

This invention relates to gloss measuring machines, and particularly to a gloss measuring machine adapted to measure a continuously moving strip material such as paper. One object of my invention is to provide a machine of the class described which is entirely automatic in its operation. Another object is to provide a gloss measuring machine which will measure sample areas from the full width of a moving strip of material without touching or otherwise injuring the material. Another object is to provide a machine which will make a continuous record of the results of the readings. Still another object is to provide a machine which is easily installed on existing machines through which strip material may pass continuously or intermittently, and other objects will appear from the following specification, the novel features being particularly pointed out in the claims at the end thereof.

It is customary in certain web forming machines, such as paper making machines, to control the gloss of the paper by baryta coating and pressure upon calendering rolls. Samples are taken at intervals and tested for uniformity of surface. Obviously by the time the test samples are made the gloss characteristics of the web are beyond control.

My present invention relates to the making of the necessary tests while the web is being made without altering the operation of the web making machine at all; and relates to the making of a continuous gloss reading from the web so that alterations in the gloss characteristics can be immediately determined either by automatically making readings at time intervals or by making continuous readings.

Coming now to the drawings wherein like reference characters denote like parts throughout:

Fig. 1 is a fragmentary sectional view of a gloss recording instrument constructed in accordance with and illustrating one embodiment of my invention;

Fig. 2 is an end elevation, partially in section, of the machine shown in Fig. 1;

Fig. 3 is one type of driving mechanism which may be used with the recording gloss meter shown in Fig. 1;

Fig. 4 is a diagrammatic showing of a preferred wiring diagram; and

Fig. 5 is another wiring diagram which may be used if only visual inspection is required.

In the following description the application of my invention to a paper making machine is described, although obviously it can also be readily applied to any strip forming machine where control of the gloss characteristics is desired during the operation of the machine.

The gloss measurements may be made by a suitable machine, such as shown in Fig. 1 as consisting of a casing 1 divided into three main parts 2, 3, and 4 by partitions 5 and 6. All these partitions are provided with light baffle plates 7 which have apertures 8 permitting radiation of a restricted beam of rays emanating from a lamp 9.

Part 4 of the machine is provided with a lamp 9 enclosed in a ventilated lamp house 10 connected by flange 11 to a wall 12 of casing 1. Condenser lenses 13 tend to collimate the rays from the lamp 9.

Parts 2 and 3 of the machine may resemble each other in size and shape, each being provided with thermopiles or photoelectric cells 14 or 15 attached to the walls 16 or 17.

It should be noted that the axes $a$ and $b$ of the compartment apertures 8 are at equal angles to the relatively plane surface $s$ of the paper strip P, and that the axis C is located to bisect the angle between $a$ and $b$. I prefer to measure the gloss of the paper by taking simultaneous readings of the surface thereof and utilizing the difference between specular reflection and diffuse reflection in determining the gloss.

In a paper by L. A. Jones and Milton F. Fillius, published in the British Journal of Photography, April 14 and 21, 1922, pages 216–218 and 229–230 a discussion of The Gloss Characteristics of Photographic Papers fully describes the system and apparatus for gloss meausurement which I prefer to employ, except that in this article visual readings are made.

For visual reading the parts may be wired as shown in Fig. 5, wherein the light receiving elements 14 and 15 are connected by wires 18 and 19 and a galvanometer 20 is shunted across these connections by wires 21. Thus one light receiving element acts against the other and a reading may be made from the galvanometer hand 22 on an arbitrary scale 23 graduated into factors for suitably designating gloss. The ratio between the two components of specular and diffuse reflected light represents the gloss of the surface at the place measured.

By moving the measuring device, intermittent or continuous readings may be taken along and across the width of the paper strip P.

Accordingly, I may mount my measuring apparatus as shown in Figs. 2 and 3 wherein the top wall 17 is provided with slide members 25, 25 on one side and 26 on the other. The first two may slide on a smooth rail 27 and the other slide member 26 may slide on the threaded rail 28 having a screw 29 with a thread engaging end 30 for driving the apparatus when the threaded rail is turned.

I have here shown rail 28 to have an endless back and forth thread 29 the ends of the right and left hand threads being connected at each end as shown at 30, Fig. 3. The measuring machine will, therefore, move across and back over strip P as shaft 28 is rotated.

Shaft 28 may be driven through gear 31, pinion 32 affixed to stub shaft 33 which may be driven through a clutch 34 comprising a fixed disk 35 and a slidable disk 36 spring pressed thereagainst, when the pin 37 is pulled down by the time clock 38. This clutch permits one revolution at a time or continuous movement.

Member 35 is driven by shaft 39, gears 40, 41, 42, and 43 by motor 44, and as will appear, the speed may be easily controlled for the work in hand by altering the gearing or pitch of screw shaft 28.

I have found it sufficient to take readings at predetermined time intervals, say every three or five minutes, and at each reading I prefer to measure across the width of the strip P. Accordingly, the time clock 38 is set and the actuation is entirely automatic.

However, with the device shown in Fig. 5 the instrument 20 would have to be observed by an operator. I prefer, therefore, to provide a chart or graph, as shown in Fig. 4, where the radiation receiving cells 14 and 15 are connected by wires 18 and 19 to a recording potentiometer 50. This instrument may be of any well known type such as a Leeds and Northrup, and preferably has a dial 51 for direct reading, and a punched or inked graph or record which may indicate all readings.

The graph is here shown as one punched at the time intervals where the readings are taken and the punches 53 show the paper has a uniform gloss.

I have shown the graduations to be purely arbitrary, as undoubtedly each manufacturer will desire graduations best suited to his particular work. The machine may be remotely located from the work room if desirable, so that the progress and the grade of the work turned out by the machines may be observed from an office or chart room.

As shown in Fig. 2, the slideway for the housing 1 is located preferably near calendering rolls 63 which are diagrammatically shown as being carried by shafts 64 having bearings 65 in a frame 66. From an upper roll (in this instance) the web P may be drawn over guide rollers 67 carried by a frame 68 which may also have upwardly extending arms 69 adapted to support shafts 26 and 28. The function of rollers 67 is merely to hold the web P in as flat a condition as possible, and due to the tension on the take-up roll the rollers 70 are generally all that is required.

It should be noted that the housing 1 does not contact in any way with the more or less delicate web P and that the readings are made without stopping, cutting or in any way damaging any part of the web. Moreover, the readings may be made so close to the calendering rolls that any unevenness in the gloss characteristics may be quickly determined and altered before much of the web is spoiled.

While this machine is of especial value in producing uniform surfaces on paper to be used for photographic light sensitive emulsions, it is also suitable for any machine where a high degree of gloss uniformity is desirable.

While I have described my invention as particularly suited to a paper making machine, it is obviously also suited for any machines making web material where a continuous or intermittent gloss reading is desirable. I contemplate as within the scope of my invention all such forms or may come within the scope of the following claims.

Having thus described my invention, what I claim as new and desire to secure by Letters patent is,—

1. In a machine for producing web material including means for guiding the web through a predetermined path, in combination with a gloss measuring device, a mount for the gloss measuring device comprising a slideway on which said device may move, said slideway positioning the gloss measuring device close to but out of contact with the web material, mechanism for moving the measuring device on the slideway relative to said web material, light emitting and receiving elements carried by said measuring device, the latter elements spaced angularly apart and being adapted to receive light reflected by the web from the first mentioned element and means for indicating the gloss characteristics of the web material controlled by said light receiving elements.

2. In a machine adapted for use with web material, a guideway for the material, a gloss measuring device adjacent the guideway and out of contact with the web material, said glass measuring device including a source of light, and angularly spaced light measuring devices for determining the gloss of the web material by measuring light reflected therefrom in two directions.

3. In a machine for use with web material, means for moving the web material through a definite path, a measuring device, a track upon which the measuring device may move, said track being adapted to space the measuring device from said web and to position it a substantially fixed distance therefrom, and means carried by the measuring device including a lamp and a pair of angularly spaced light sensitive elements controlled by the reflective properties of the web as illuminated by the lamp for measuring parts of the web material throughout its width.

4. In a machine for use with web material, a guideway for the material, a support adjacent the material, a measuring device adapted to measure the gloss characteristics of the web material mounted on the support, said device including a source of light adapted to be directed upon the web material, light sensitive elements arranged at different angles to the web material and adapted to receive light reflected by the web from the source of light, said light sensitive elements being connected to a recording mechanism adapted to produce a record of the gloss characteristics determined by the measuring device.

5. In a machine for use with web material, a guideway for the material, a support adjacent the material, a measuring device adapted to measure the gloss characteristics of the web material mounted on the support, said device including a source of light adapted to be directed upon the web material, spaced light-sensitive elements adapted to receive rays reflected at different angles by the web material, and means connected with said light sensitive elements for indicating the gloss characteristics of said web material.

Signed at Rochester, New York, this 27 day of July 1928.

EARL M. LOWRY.